United States Patent
Novikov et al.

(10) Patent No.: US 6,282,304 B1
(45) Date of Patent: Aug. 28, 2001

(54) BIOMETRIC SYSTEM FOR BIOMETRIC INPUT, COMPARISON, AUTHENTICATION AND ACCESS CONTROL AND METHOD THEREFOR

(75) Inventors: Sergey Olegovich Novikov; Oleg Mikhailovich Chernomordik, both of Moscow (RU)

(73) Assignee: Biolink Technologies International, Inc., Miramar, FL (US)

(*) Notice: Subject to any disclaimer, the term of this patent is extended or adjusted under 35 U.S.C. 154(b) by 0 days.

(21) Appl. No.: 09/312,002

(22) Filed: May 14, 1999

(51) Int. Cl.[7] .................................................. G06K 9/00
(52) U.S. Cl. .......................................... 382/125; 340/5.83
(58) Field of Search .................................. 382/115, 124, 382/125; 235/380, 492; 704/246, 273; 902/3, 41, 251; 340/5.52, 5.53, 5.82, 5.83; 283/68; 356/71; 703/1, 26, 42

(56) References Cited

U.S. PATENT DOCUMENTS

| | | | |
|---|---|---|---|
| 3,940,795 | 2/1976 | Lemelson | 360/101 |
| 4,152,056 | 5/1979 | Fowler | 396/15 |

(List continued on next page.)

FOREIGN PATENT DOCUMENTS

WO 98/.11501   3/1998 (WO).
WO 98/11478    3/1998 (WO).
WO 98/11501    3/1998 (WO).

OTHER PUBLICATIONS

"A Real–Time Matching System for Large Fingerprint Databases" by Nalini K. Ratha et al., IEEE Transactions on Pattern Analysis and Machine Intelligence, vol. 18, No. 8, Aug. 1996, pp. 799–813.

"Access to Lots of Gadgets Could be at Your Fingerprints"—The New York Times, Thursday, Mar. 4, 1999.

"Indentix to acquire Indenticator Technology; To create the world's largest Fingerprint Security firm".

*Primary Examiner*—Amelia Au
*Assistant Examiner*—Samir Ahmed
(74) *Attorney, Agent, or Firm*—Malloy & Malloy, P.A.

(57) ABSTRACT

A biometric input device, system and method includes a biometric input device having a scanning window surrounded by a ridge for ensuring positive positioning of a biometric sample such as a thumb. The biometric input device includes an optical assembly having a prism with a focusing lens disposed on a side thereof and optionally integrally formed therewith. A biometric comparison method is provided for comparing data from said biometric input device with data from a database using both directional image comparison and clusterized minutia location and direction comparison. A further system is provided for allowing access to computer functions base on the outcome of the comparison method.

6 Claims, 10 Drawing Sheets

U.S. PATENT DOCUMENTS

| | | | |
|---|---|---|---|
| 4,210,899 | 7/1980 | Swonger et al. | 382/125 |
| 4,322,163 | 3/1982 | Schiller | 256/71 |
| 4,428,670 | 1/1984 | Ruell et al. | 356/71 |
| 4,438,824 | 3/1984 | Muller-Schloer | 713/185 |
| 4,537,484 | 8/1985 | Fowler et al. | 396/15 |
| 4,876,726 * | 10/1989 | Capello et al. | 382/124 |
| 4,924,085 | 5/1990 | Kato et al. | 250/227.28 |
| 4,993,068 | 2/1991 | Piosenka et al. | 713/186 |
| 4,995,086 | 2/1991 | Lilley et al. | 382/124 |
| 5,067,162 | 11/1991 | Driscoll, Jr. et al. | 382/126 |
| 5,131,038 | 7/1992 | Puhl et al. | 340/5.61 |
| 5,229,764 | 7/1993 | Matchett et al. | 340/5.52 |
| 5,335,278 | 8/1994 | Matchett et al. | 380/248 |
| 5,335,288 | 8/1994 | Faulkner | 383/115 |
| 5,416,573 | 5/1995 | Sartor, Jr. | 356/71 |
| 5,420,936 | 5/1995 | Fitzpatrick et al. | 382/124 |
| 5,475,839 | 12/1995 | Watson et al. | 713/2 |
| 5,483,601 | 1/1996 | Faulkner | 382/115 |
| 5,502,759 | 3/1996 | Cheng et al. | 379/88.02 |
| 5,526,428 | 6/1996 | Arnold | 713/159 |
| 5,528,355 | 6/1996 | Maase et al. | 356/71 |
| 5,546,471 | 8/1996 | Merjanian | 382/124 |
| 5,586,171 | 12/1996 | McAllister et al. | 379/88.02 |
| 5,608,387 | 3/1997 | Davies | 340/5.27 |
| 5,613,012 | 3/1997 | Hoffman et al. | 382/115 |
| 5,650,842 | 7/1997 | Maase et al. | 356/71 |
| 5,655,013 | 8/1997 | Gainsboro | 379/188 |
| 5,659,626 * | 8/1997 | Ort et al. | 382/125 |
| 5,680,205 | 10/1997 | Borza | 356/71 |
| 5,719,950 | 2/1998 | Osten et al. | 382/115 |
| 5,748,184 | 5/1998 | Shieh | 345/173 |
| 5,748,766 | 5/1998 | Maase et al. | 382/124 |
| 5,764,222 | 6/1998 | Shieh | 345/173 |
| 5,764,789 | 6/1998 | Pare, Jr. et al. | 382/115 |
| 5,774,571 | 6/1998 | Marshall | 382/119 |
| 5,781,651 | 7/1998 | Hsiao et al. | 382/127 |
| 5,825,474 | 10/1998 | Maase | 356/71 |
| 5,838,306 | 11/1998 | O'Connor et al. | 345/163 |
| 5,844,244 | 12/1998 | Graf et al. | 235/375 |
| 5,848,231 | 12/1998 | Teitelbaum et al. | 713/200 |
| 5,867,795 | 2/1999 | Novis et al. | 455/566 |
| 5,867,802 | 2/1999 | Borza | 340/5.5 |
| 5,872,834 | 2/1999 | Teitelbaum | 379/93.03 |
| 5,881,226 | 3/1999 | Veneklase | 713/202 |
| 5,889,474 | 3/1999 | LaDue | 340/825.49 |
| 5,926,533 | 7/1999 | Gainsboro | 379/188 |
| 5,930,804 | 7/1999 | Yu et al. | 707/104 |
| 5,952,641 | 9/1999 | Korshun | 235/382 |
| 5,953,443 * | 9/1999 | Hiratusuka et al. | 340/5.83 |
| 5,954,583 | 9/1999 | Green | 463/29 |
| 5,963,657 | 10/1999 | Bowker et al. | 382/127 |
| 5,963,908 | 10/1999 | Chadha | 704/273 |

* cited by examiner

MOUSE OPERATION FLOW CHART

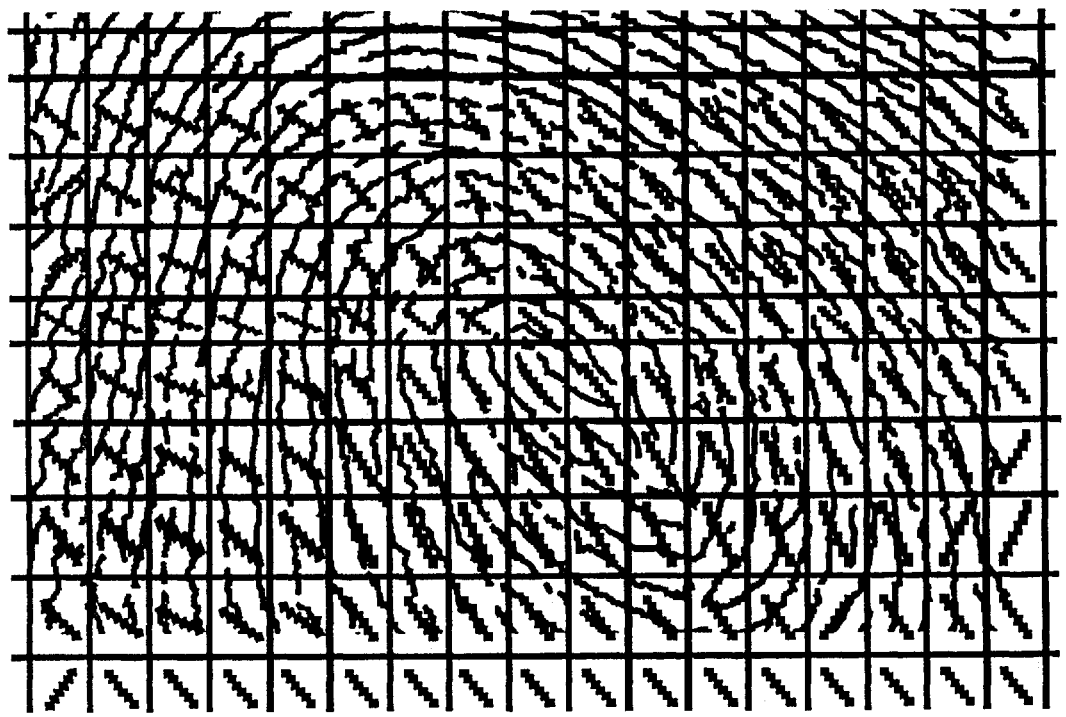
FIG. 7
   
FIG. 8A               FIG. 8B

BIOMETRIC SYSTEM FOR BIOMETRIC INPUT, COMPARISON, AUTHENTICATION AND ACCESS CONTROL AND METHOD THEREFOR

BACKGROUND OF THE INVENTION

The present invention relates to a system and method for biometric input, comparison, and authentication and, more particularly, to a biometric input device having a scanning window with a ridge structure, illuminated prism, an image detector and scanning electronics operable in conjunction with biometric data comparison system for comparing directional and minutia data. The biometric data comparison system provides for controlled access to a computing system based upon comparison of inputted biometric data with biometric data stored in a database. The system and method of the present invention further provides for secure communication of biometric data over public lines.

Biometric input devices are known for use with computing systems. Such biometric input devices include computer mouse designs. Existing designs for such biometric input devices have scanning windows lacking efficient positioning structure for scanning positioning and protection from ambient light, and do not provide mechanical integration of a position sensing ball assembly with an optical scanning assembly maximizing reliability of position sensing ball operation.

Biometric data comparison methods and systems are known. Such known systems and methods suffer from various drawbacks including intensive computing power requirements, intensive memory requirements, slow data transfer, slow comparison, and comparison reliability reduction due to environmental and physiological factors. Known systems also fail to provide for secure communication of biometric data over public lines.

SUMMARY OF THE INVENTION

Accordingly, it is an object of the invention to provide a system and method for biometric input and comparison which overcomes the drawbacks of the prior art.

It is a further object of the invention to provide an ergonomically advantageous biometric input device which ensures increased precision is sampling biometric data.

It is a still further object of the invention to provide a biometric data comparison method which controls access to computers or data networks.

It is yet another object of the invention to provide a fingerprint comparison method which provides for accurate and rapid comparison of fingerprints while compensating for environmental and physiological factors.

An object of the present invention is also to provide a biometric based access control system for use on computers which permits a user to graphically apply biometric access control features to data and applications by the use of a user manipulated biometric protection icon.

Briefly stated, the present invention provides a biometric input device, system and method which includes a biometric input device having a scanning window surrounded by a ridge for ensuring positive positioning of a biometric sample such as a thumb. The biometric input device includes an optical assembly having a prism with a focusing lens disposed on a side thereof and optionally integrally formed therewith. A biometric comparison method is provided for comparing data from said biometric input device with data from a database using both directional image comparison and clusterized minutia location and direction comparison. A further system is provided for allowing access to computer functions based on the outcome of the comparison method.

The present invention also provides a biometric input device for accepting a fingerprint of a finger tip having opposing tip sides and a tip end, comprising a device body having a body wall defining an aperture and an optical assembly for scanning the fingerprint disposed in the device body. The optical assembly has a scanning surface at the aperture upon which the finger tip is placed for scanning of the fingerprint by the optical assembly. A ridge surrounds a portion of a periphery of the aperture such that the ridge engages the opposing tip sides and the tip end such as to position the fingerprint on the scanning surface and block ambient light.

A further feature of the present invention includes the aforesaid biometric input device having a device body with a bottom surface opposing a substrate upon which the device body is placed, a device body length and a front portion, a middle portion and a heel portion. A movement detection device for detecting movement of the device body relative the substrate is provided and the bottom surface defines a bottom surface aperture through which the movement detection device detects movement of the device body relative the substrate. The bottom surface aperture is disposed in the heel portion of the device body and the optical assembly is disposed in the middle portion of the device body. In an embodiment of the present invention the movement detection device has a ball protruding through the bottom surface aperture for engaging the substrate to register the movement of the device body relative the substrate.

According to a feature of the invention, there is further provided a biometric input device for accepting a fingerprint of a finger tip having opposing tip sides and a tip end, comprising a device body having a body side wall defining an aperture, an optical assembly for scanning the fingerprint disposed in the device body. The optical assembly includes an imaging component for converting a light image into pixel output and a lens for focusing the light image into the imaging component. The optical assembly includes a prism with first, second and third sides and a top side wherein the first side forms a scanning surface at the aperture upon which the finger tip is placed for scanning of the fingerprint by the optical assembly, the second side has the lens for focusing the light image into the imaging component disposed thereon, and the third side has a light absorbing layer.

The present invention also includes the above embodiment wherein, in the alternative or in combination with one another, the lens is formed integrally with the prism and a light emitting device is disposed to emit light into the prism from the top side of the prism to illuminate the fingerprint when disposed at the scanning surface.

According to a still further feature of the invention, there is provided a biometric comparison method comprising a series steps beginning with (a) scanning in a fingerprint and digitizing scanning signals to produce a matrix of print image data representing pixels. Next the method proceeds with (b) dividing the print image data into cells, each including a number of pixel data for contiguous pixels, and (c) calculating a matrix of directional image data DI using gradient statistics applied to the cells wherein the directional image data DI includes for each of the cells a cell position indicator and one of a cell vector indicative of a direction of ridge lines and an undirectional flag indicative of a nondirectional calculation results. Processing then continues with (d) skeletonizing the print image data, and (e) extracting minutia from the print image data and producing a minutia data set comprised of data triplets for each minutia extracted including minutia position data and minutia direction data. Next, a comparing process is initiated by (f) providing reference fingerprint data from a database wherein the reference fingerprint data includes reference directional image data DI and a reference minutia data set, and (g) performing successive comparisons of the directional image data DI with the reference directional image data DI and determining a directional difference DifDI for each of the successive comparisons wherein for each of the successive comparisons one of the directional image data DI and the reference directional image data DI is positionally shifted by adding position shift data. It a next step (h) it is determined for which of the successive comparisons the directional difference DifDI is the least and the position shift data thereof is selected as initial minutia shift data. A next stage of the comparison process proceeds with (i) positionally shifting minutia data by applying the initial minutia shift data to one of the minutia data set and the reference minutia data set to initially positionally shift the minutia position data and the minutia orientation data, then (j) performing successive comparisons of the minutia data set with the reference minutia data set following the positionally shifting minutia data and determining matching minutia based on a minutia distance criteria, a number of matching minutia, and a similarity measure indicative of correspondence of the matching minutia for each of the successive comparisons wherein, for each of the successive comparisons, one of the minutia data set and the reference minutia data set is positionally shifted within a minutia shift range R by adding minutia position shift data, and finally (k) determining a maximum similarity measure of the similarity measures of the successive comparisons. The comparison method concludes with (1) determining whether the maximum similarity measure is above a similarity threshold and indicating the reference fingerprint data and the fingerprint data are from the same fingerprint when the maximum similarity measure is above the similarity threshold.

The present invention also includes the above method wherein, as an alternative, the calculation of the directional image data includes (c1) identifying a directional group of cells comprising all cells of the cells that do not have the undirectional flag associated therewith; and then excluding from the successive comparisons of minutia of minutia data sets of one of the minutia data set and the reference minutia data set located in or positionally aligned with the cells that have the undirectional flag associated therewith.

The present invention further provides a feature for use in conducting the successive comparisons of minutia comprising dividing the minutia data set into the minutia data set clusters formed of contiguous ones of the cells and each including a predetermined number of the minutia before conducting the successive comparisons, conducting the successive comparisons for each of the minutia data set clusters and determining for each of the minutia data set clusters a maximum similarity measure, and finally determining the maximum similarity measure as a sum of the maximum similarity measures of each of the minutia data set clusters.

The present invention also provides for the above comparison method excluding from further processing pairs of the minutia located within a minutia exclusion distance of one another and having minutia direction data with a direction exclusion limit of being in opposite directions.

The present invention further provides a feature wherein in the above comparison method the minutia extraction step extracts minutia limited to ends and bifurcations. Still further there is provided a feature wherein the minutia data set excludes data distinguishing ends and bifurcations.

Yet another feature of the present invention is a biometric comparison system comprising a computer having a memory including a reference fingerprint data and at least one of file data and application software, a display, an apparatus for representing at least one of file data and application software as icons on the display, and a biometric input device for scanning a fingerprint and storing fingerprint data representing the fingerprint into the memory. A comparison engine is provided for comparing the fingerprint data with the reference fingerprint data and determining a match if a similarity threshold is satisfied. An access control icon generator permits a user to move an access control icon on the display and an access control means is provided for controlling access to the at least one of file data and application software when a user moves the access control icon onto the icon representing the at least one of file data and application software whereby access to the at least one of file data and application software is permitted only if a user scans a fingerprint producing fingerprint data for which the comparison means determines matches the reference fingerprint data.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a block schematic of the biometric input device of FIG. 2a;

FIG. 5 is a flow chart for operation of the biometric input device of FIG. 2a;

FIG. 7 is an illustration of a directional image analysis;

FIG. 8(a) is an image of a fingerprint based on data received from an optical scanning assembly;

FIG. 8(b) is an image of the fingerprint of FIG. 8(a) following low pass filtering;

DETAILED DESCRIPTION

Figure 1A:
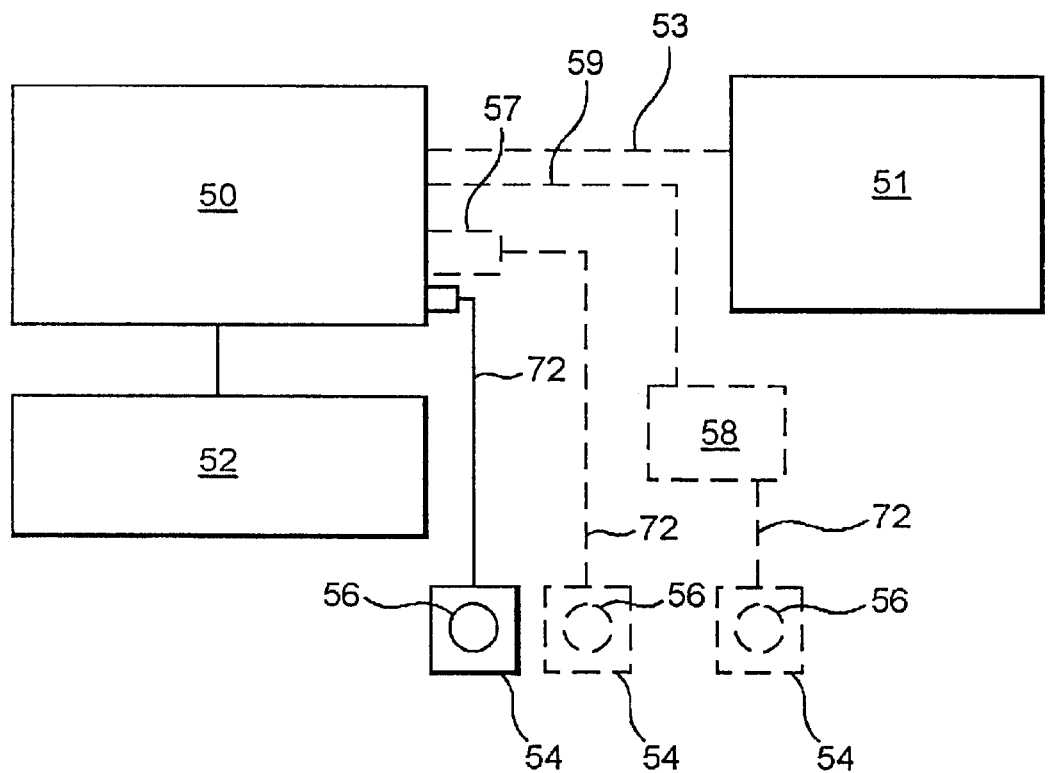
FIG. 1a is a block diagram of a system of the present invention.

Referring to FIG. 1a, a computer 50 has a keyboard 52 and a biometric input device 54 with a scanning window 56 for accepting biometric input. The computer 50 may take the form of a personal computer, a dedicated device such as an ATM machine, a dumb terminal, or a computer on the order of a workstation, minicomputer or mainframe. Optionally, the computer 50 is connected to a remote computer 51 via a link 53 which may be a direct link via phone lines or direct cabling, or via a network such as a LAN, WAN, intranet or Internet. In order to gain access to use of the computer 50, or remote computer 51, for all or only specified functions, a user must provide a biometric input to the biometric input device 54 via the scanning window 56. Hereinafter the computer 50 will be referred to, however, it is understood that the remote computer 51 may optionally perform the functions ascribed to the computer 50 with the computer 50 functioning as a terminal. Likewise, reference to gaining access to use of the computer 50 is understood to include the alternative of access to use of the remote computer, 51.

The computer 50 compares biometric data, representing the biometric input, with stored biometric data and determines if the biometric data corresponds to any stored biometric data held in a data base. If a correspondence exists, the user is given authorization, that is, the user is allowed access to the computer 50 for performance of the specified functions or for use of the computer 50 in general.

The biometric input device 54 is connected to the computer 50 via an input cord 72. Alternatively, depending upon the type of port the biometric input device 54 uses to communicate with the computer 50, an embodiment of the present invention has a port adaptor connector 57 connecting the input cord 72 to a corresponding port on the computer 50. A still further alternative provides an embodiment of the present invention wherein a standalone adaptor unit 58 channels data via the input cord 72 and a cable 59 to and from the computer 50.

Figure 1B:
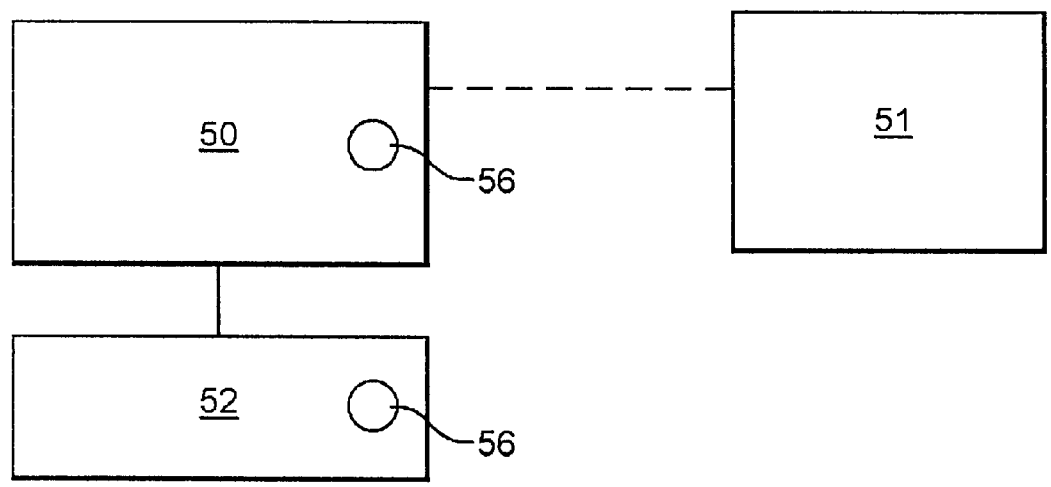
FIG. 1b is a block diagram of an alternative system of the present invention.

Referring to FIG. 1b, an alternative configuration is shown wherein the scanning window 56 and associated structure is incorporated in either the computer 50 or the keyboard 52. In such instances, the standalone biometric input device 54 is omitted and functions thereof are performed by the computer 50 or by circuitry incorporated in the keyboard 52. It is understood that functions discussed herein with respect to the biometric input device 54 and the computer 50 may optionally be distributed between the biometric input device 54 and the computer 50 as is practical.

Figure 2A:
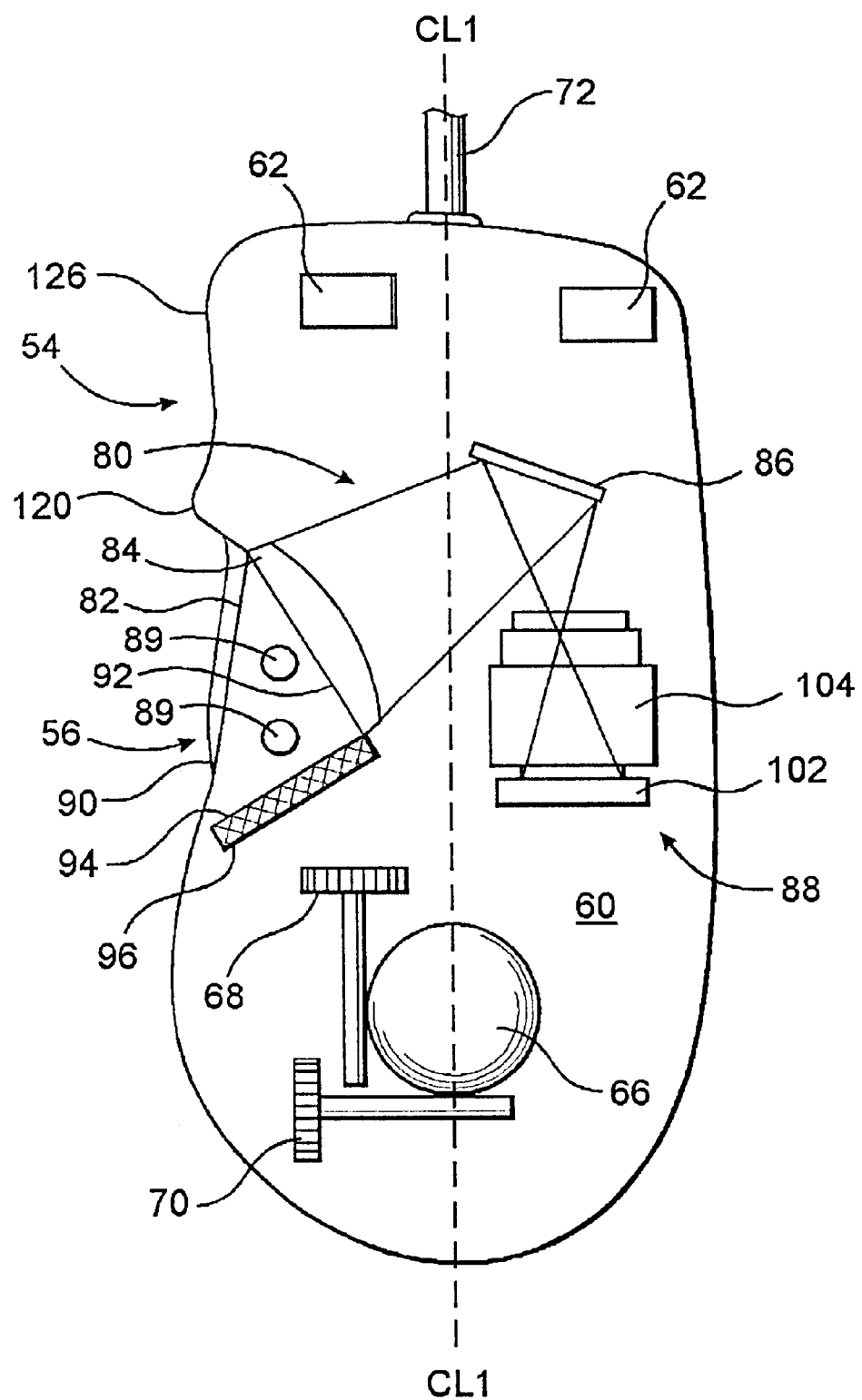
FIG. 2a is a top plan simplified view of a biometric input device of the present invention.
Figure 2B:
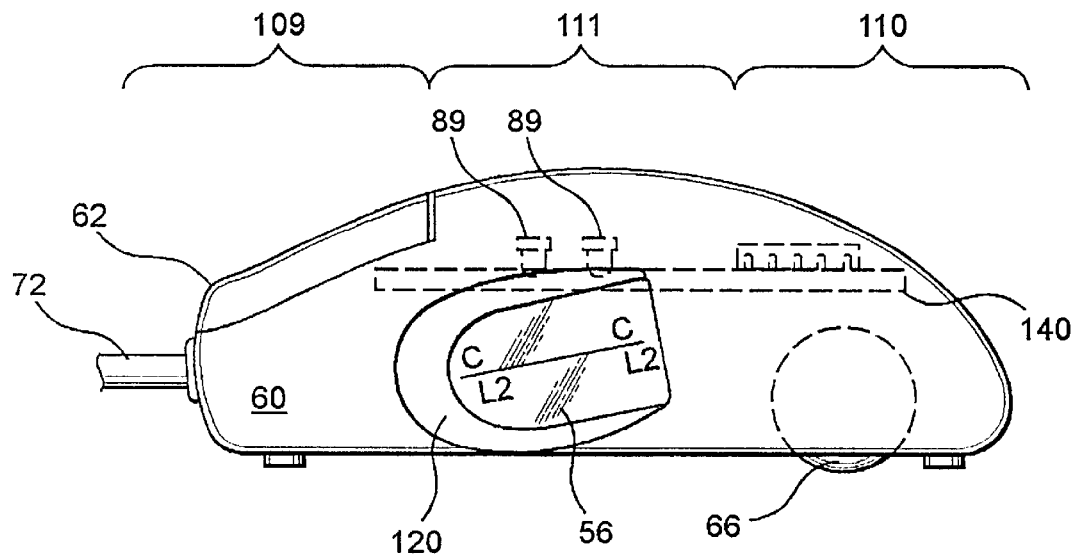
FIG. 2b is a side elevation view of the biometric input device of FIG. 2a showing internal components in dashed lines.

Referring to FIGS. 2a and 2b, the biometric input device 54 is shown in the form of a computer mouse 60. Alternatively, the biometric input device may take the form of another type of input device such as a track ball, joystick, touchpad or other variety of input device. The computer mouse 60 includes a left button 62, a right button 64, a ball 66, an x sensor 68, and a y sensor 70. Various means may be used to effect input from these devices including mechanical, optical or other. For example, optical means may be substituted for the ball 66 to detect mouse movement. The input cord 72 connects to the computer 50 for effecting data transfer. Optionally, the input cord 72 is replaced by wireless means for effecting data transfer which operate using optical or electromagnetic transmission.

An optical assembly 80 includes a prism 82, a first lens 84, a mirror 86, a CCD assembly 88, and LED's 89. The prism 82 has first, second and third sides, 90, 92 and 94, respectively. The first side 90 forms the surface of the scanning window 56. Coatings or a transparent plate may optionally be used to protect the first side 90. The second side 92 has the first lens 84 fixed thereon or formed integrally with the prism 82. Preferably, the prism 82 is molded integrally with the first lens 84 which provides for reducing part count and simplifying assembly of the biometric input device 54. The third side 94 has a light absorbing coating 96. The CCD assembly 88 includes a CCD sensor 102 and a second lens 104 which functions as an object lens. The first and second lenses 84 and 104 function in conjunction with the mirror 86, as shown by light ray tracings, to focus an image at the first surface 90 onto the CCD sensor 102. Various other lens assemblies may optionally be realized by those of ordinary skill in the art and are considered to be within the scope and spirit of the present invention.

In order to input biometric data, a user holds the computer mouse 60 with the index, middle or third finger extended to operate the left and right buttons, 62 and 64, and with the thumb contacting the scanning window 56 to permit an image of a thumb print to be focussed onto the CCD sensor 102. The user then operates any of the left and right buttons, 62 or 64, or other input device to initiate scanning of the thumb print. Alternatively, scanning may be automatically initiated by circuitry in the biometric input device 54 or the computer 50.

The structural configuration of the computer mouse 60 is detailed below wherein a front portion 109 of the computer mouse 60 refers to an end portion of the computer mouse 60 where the input cord 72 extends from and the left and right buttons, 62 and 64, are situated, a heel portion 110 comprises a rear end portion where a user's palm typically rests, and a middle portion 111 is an area where balls of the user's hand typically are situated. The front portion 109, the heel portion 110, and the middle portion 111 are situated to define thirds of a length L of the computer mouse 60 extending from a front end of the front end portion 109 to a rear end of the heel portion 110.

The scanning window 56 is situated on a side of the middle portion 111 and has a ridge 120 framing at least three sides of the scanning window 56. The ridge 120 is configured to accept a perimeter of a user's thumb thereby defining a scanning position of the user's thumb in the scanning window 56. Furthermore, the ridge 120 serves to shield the scanning window 56 from ambient light during the scanning process and also to protect the scanning window 56 from damage.

The ball 66 is disposed with a center thereof within the heel portion 110 of the computer mouse 60. Such disposition of the ball 66 provides advantageous situation of the ball 6 under the palm of the user so that pressure from the palm during operation ensures positive contact of the ball 66 with a substrate upon which the computer mouse 60 is used. The ball 66 is optionally disposed rearward of a mid-position in the computer mouse 60 wherein the mid-position is a middle of the length L of the computer mouse 60. In conventional configurations the ball 66 is situated either in the middle portion, forward of the mid-position in the computer mouse, or in the front portion. Such a construction is prone to intermittent contact of the ball with the substrate due to the user applying excessive downward force to the heel portion of the mouse resulting in the front and middle portions rising from the substrate.

A circuit board 140 contains circuitry for effecting scanning operation of the optical assembly 80. As an alternative to the optical assembly 80, a contact detection assembly may be realized wherein the scanning window 56 takes the form of a silicon contact sensor. In either configuration, a thumb print of the user is represented by data of an array of pixels. The LED's 89 are mounted on the circuit board 140 in a position above a top surface of the prism 82 to radiate light into the prism 82 for scanning the thumb print. The embodiment shown has two LED's, but it is realized a single LED may be used or alternative light generating devices may be substituted therefor. Furthermore, although the embodiment shown provides the LED's 89 mounted on the circuit board 140, the LED's 89 are alternatively mounted on the prism 82 or molded into the prism 82 at the top side in the same operation wherein the first lens 84 is molded integrally with the prism 82.

Figure 3A:
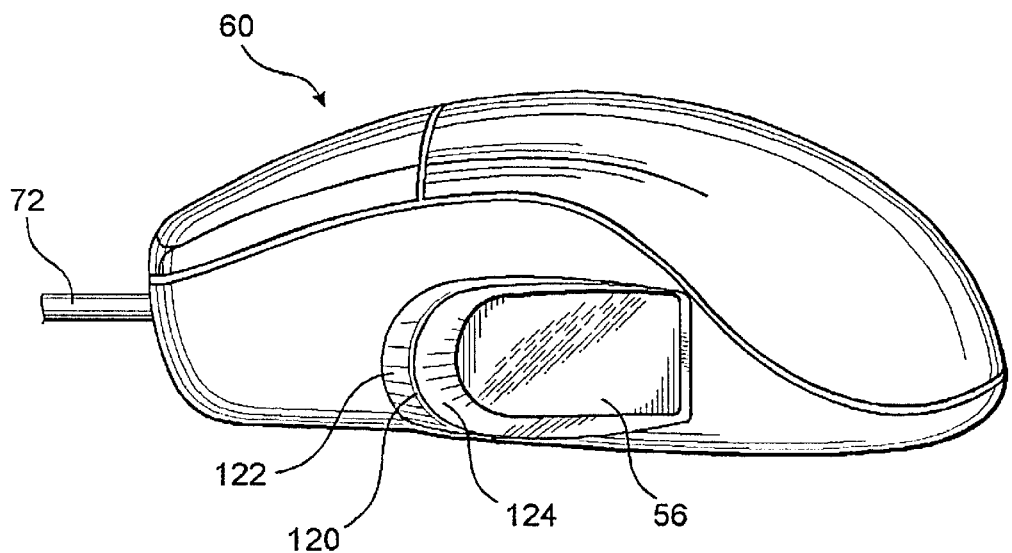
FIG. 3a is a side elevation view of the biometric input device of FIG. 2a showing surface contours.
Figure 3B:
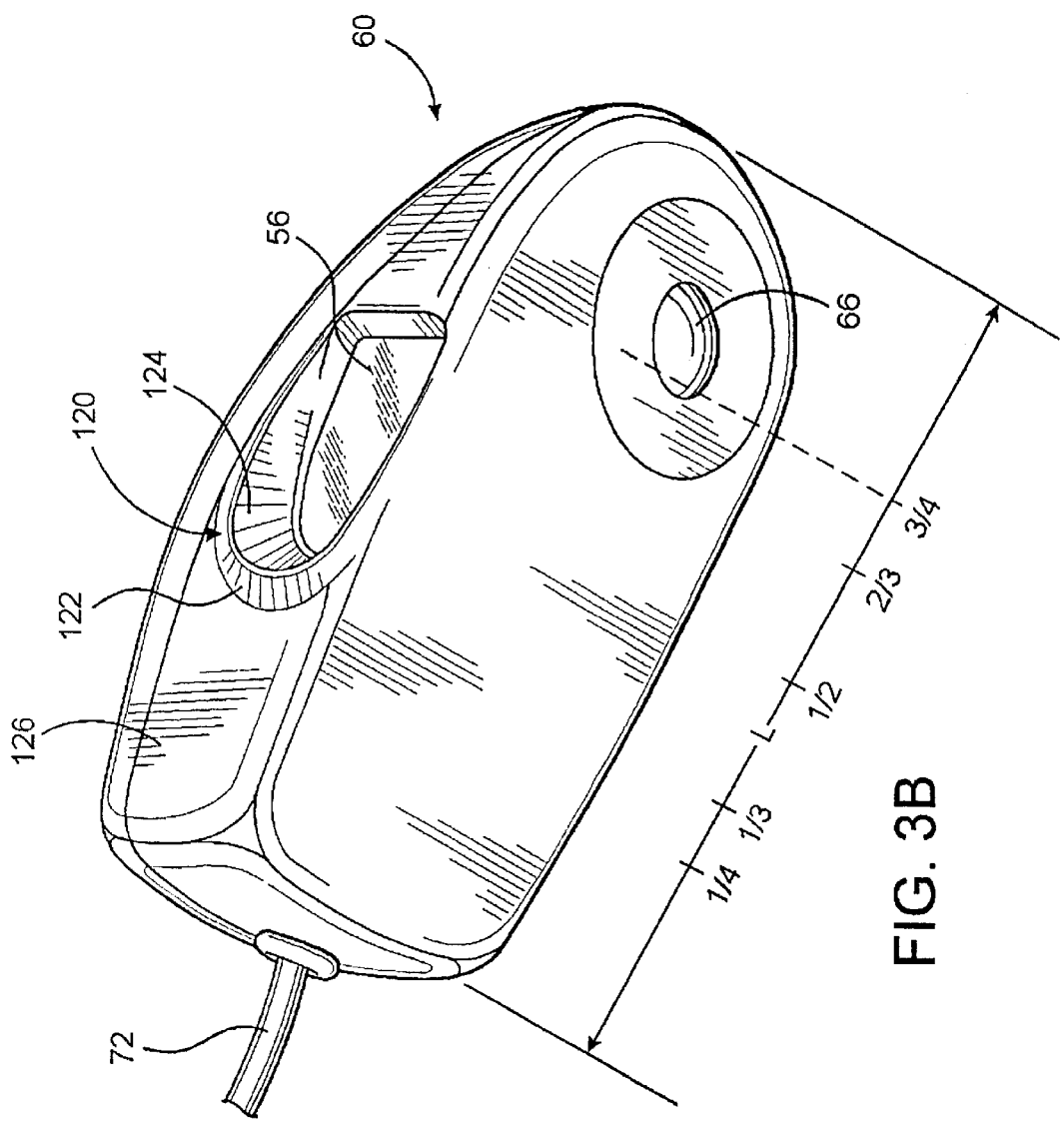
FIG. 3b is a bottom perspective view of the biometric input device of FIG. 2a showing surface contours and dimensional disposition of features.

Referring to FIGS. 3a and 3b, perspective depictions of the computer mouse 60 illustrate the length L of the computer mouse 60, the disposition of the ball 66 and ridge structure of the ridge 120. The ridge 120 has an outer surface 122 extending outwardly from a side surface 126 of the computer mouse 60 and an inner surface 124 extending from a peak of the ridge structure to the scanning surface 56. The ridge 120 is raised from the side surface 126 on at least three sides of the scanning window 56, that is, front, top and bottom sides. On a fourth side, a rear side, a rise of the ridge 120 from the side surface 126 is optionally omitted to permit ease of insertion of the thumb against the scanning window 56. The location of the ridge 120 on the three sides of the scanning window 56 ensures positive location of the thumb for scanning purposes to minimize scan to scan variations in positioning of the thumb print thereby facilitating thumb print comparisons. The center of the ball 66 is shown rearward of the mid-position, the middle portion 111 which includes the middle third of the computer mouse 60, and the three quarter length position. The outer surface 122 is concave but may optionally be flat or convex. Likewise, the inner surface 124 is concave but may optionally be flat or convex. Furthermore, the outer surface 122 may be omitted with the inner surface 124 serving alone to position the thumb wherein the inner surface 124 defines a recess in the side surface 126. However, the rising of the outer surface 122 from the side surface 124 provides for the side surface 126 protruding less outwardly from a mouse body centerline CL1 of the computer mouse 60, shown in FIG. 2a, thereby providing for a functionally less cumbersome device.

Referring again to FIG. 2a, a surface of the scanning window 56 is inclined with respect to the mouse body centerline CL1 to define an acute angle with respect thereto in the range of 5° to 25°, and preferably in the range of 10° to 20°. A front edge of the scanning surface 56 is recessed inwardly toward the mouse body centerline CL1 from a position of the side wall 126 relative to the mouse body centerline CL1. Such positioning provides for an ergonomically advantageous positioning of the thumb when the computer mouse 60 is held. In one embodiment of the invention the scanning window 56 has a length of about 30 mm and a width of about 18 mm.

Referring again to FIG. 2b, the scanning window 56 is inclined in the vertical plane with respect to the substrate upon which the computer mouse 60 rests such that a longitudinal center line CL2 of the scanning surface defines an acute angle with respect to the substrate in the range of 0° to 25°, and preferably in the range of 5° to 15°. Such positioning provides for a further ergonomically advantageous positioning of the thumb when the computer mouse 60 is held.

The prism 82 is a right angle prism with a forward acute angle in the range of 40° to 60° and preferably in the range of 45° to 55°. The mirror 86 serves to redirect light to the CCD assembly 88 thereby providing for a compact arrangement of the optical assembly 80. In one embodiment the forward angle is about 50°.

Figure 4:
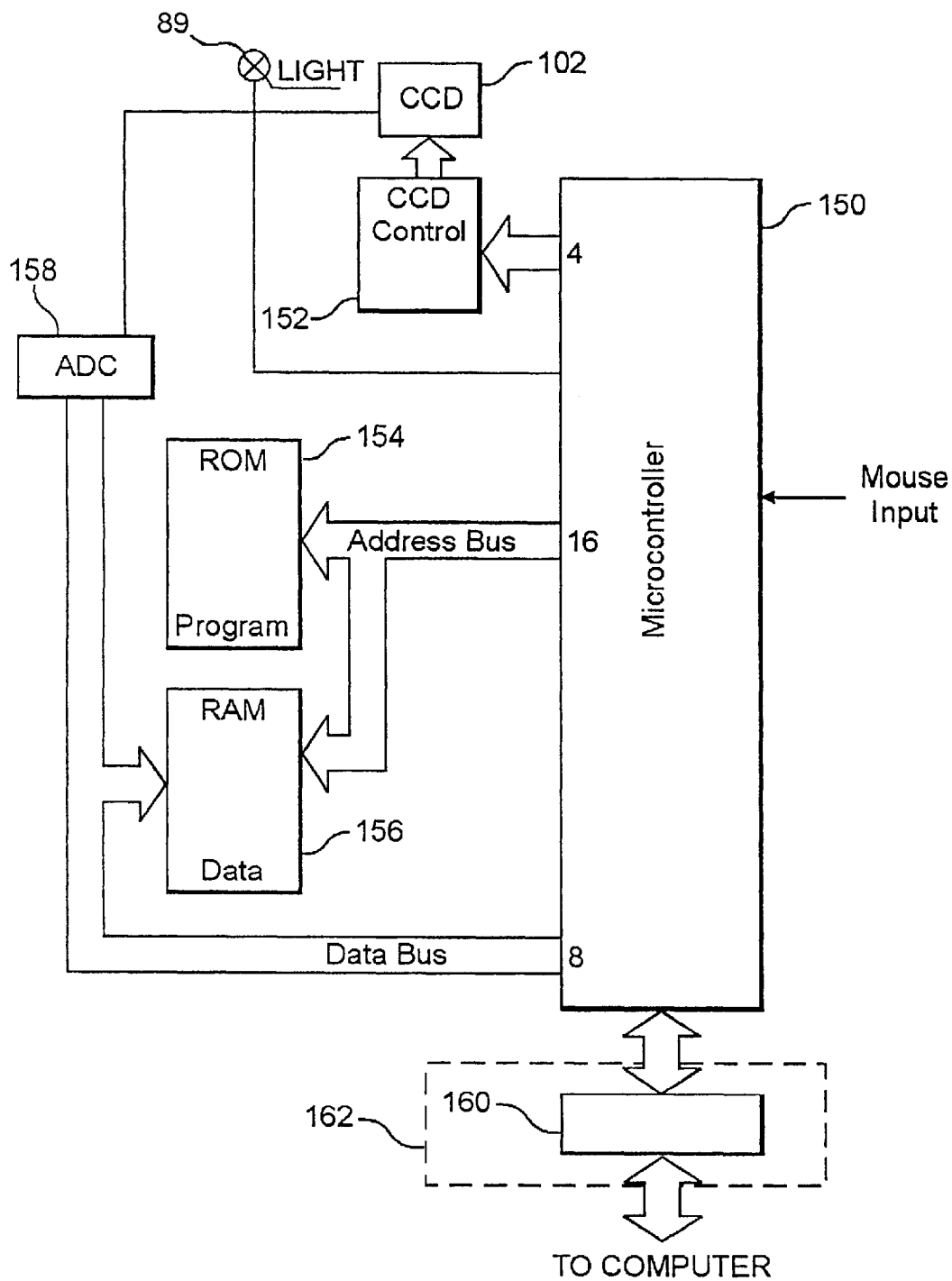

Referring to FIG. 4, an embodiment of circuitry provided on the circuit board 140 is shown. A microcontroller 150 is interfaced with a CCD controller 152, a ROM 154, a RAM 156, and an A/D converter 158. Output from the CCD sensor 102 is input to the A/D converter 158 where it is digitized. The CCD controller 152 effects scanning of the CCD sensor 102 to transfer sensed levels of the pixels of the CCD sensor 102. The microcontroller 150 further controls intensity of light produced by the LED 89. An interface controller 160 is interfaced with the microcontroller 150 to effect communication with a serial port of the computer 50. Other interfaces may be employed permitting data communication with the computer 50. Furthermore, the microcontroller 150 may optionally receive mouse input from the left and right mouse buttons, 62 and 64, and the x and y sensors, 68 and 70, and transmit the mouse input to the computer 50 to effect combined functions of thumb print scanning and mouse control.

The microcontroller 150 is optionally in the form of a programable logic device (PLD). One such device is the FLEXIOK from Altera. The microcontroller 150 controls the CCD controller 152, determines a size and position of a frame, records image data of the frame into the RAM 156, and supports communication protocol with the interface controller 160, such as the RS-232 interface, the PS-2 interface, or the USB interface.

The ROM 154 stores program codes for the microcontroller 150 and may be programmed to effect operations over various interfaces. While discrete IC's are shown, it is realized that the functions of the IC's may integrated in a single IC. The CCD controller 152 effects reading of successive pixels and lines of the CCD sensor 102. A matrix of data from the pixel array of the CCD sensor 102 forms the frame and is stored in the RAM 156. The frame consists of data representative of the thumb print image and preferably excludes data from pixels not representative of the thumb print image. Thus, the frame represents a subset of data from a complete scanning of the CCD sensor 102. Accordingly, the amount of data to be processed and sent to the computer 50 is optionally reduced from that of an entire scan of the CCD sensor 102.

In an embodiment of the invention, the interface controller 160 may be incorporated into an interface unit 162 for connecting the input cord 72 to the computer to permit operation over various interfaces by substitution of the interface unit 162 having the desired interface controller 160. The interface unit 162 may be in a separate housing connectable to a desired input port, as shown in FIG. 1a as the standalone adapter unit 58, or a connector housing itself as shown in FIG. 1a as the port adapter connector 57. Implementation of the interface unit 162 is dictated by the type of port to be interfaced.

A parallel printer port interface (LPT), that is, a PS2 port interface, may be effected using a microcontroller and a PLD, for example, a ZILOG Corp. Z86E02 in conjunction with a FLEX8K PLD from Altera Corp. In such instance the interface connector 162 is a separate housing which is connected to the computer's printer port with a cable and has a connector for the input cord 72 and for a parallel printer cable through which a printer may be interfaced to the computer 50. Power is supplied to the interface connector 162 and the computer mouse 60 via the PS2 port from the computer 50. Data exchange for the computer mouse's 50 usual mouse input, that is, input from the left and right buttons, 62 and 64, and the x and y sensors, 69 and 70, is effected using standard protocol for a PS2 mouse interface and the PLD based on output from the microcontroller 150 of the computer mouse 60.

A full speed USB interface at 12 MBaud may be effected using a processor in the interface unit 162, such as an Intel Corp. 930, which has in-built USB functions. In such an instance the interface unit 162 is optionally a separate housing in the form of the standalone adapter unit 58 which is connected to the computer's USB port with a cable 59, as shown in FIG. 1*a*, and has a connector for the input cord 72. Power is supplied from the computer 50 for the interface unit 162 and the computer mouse 60 via the USB port.

A serial port interface, that is, a COM port interface, functioning at 115.2 KB may be effected using a processor in the interface unit 162, such as an Atmel AT29C2051, and an RS232 voltage converter. In such an instance the interface unit 162 is optionally incorporated in a connector for connecting the input cord 72 to the computer's 50 serial port. Power is supplied from the computer 50 via a further connector and is processed by the voltage converter to drive the computer mouse 50.

Figure 5:
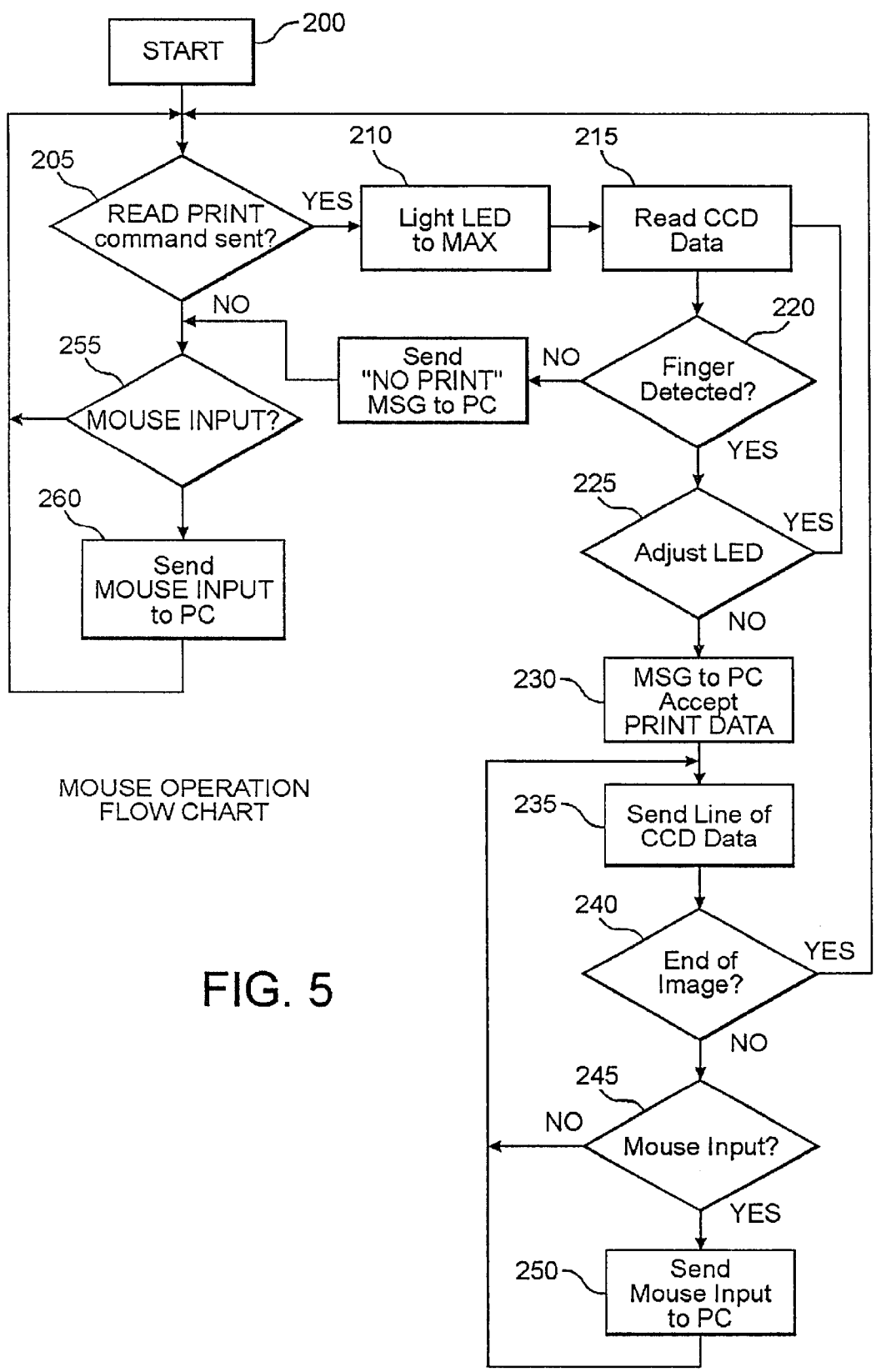

Referring to FIG. 5, a flow chart is shown of operation of the computer mouse 60. Operation begins at an start point 200 and proceeds to a decision step 205 to determine whether a read print command is received from the computer 50, referred to as "PC" in the flowchart, to read in a thumb print. If a "read print"command is received, the LED 89 is lit to a maximum level in step 210. Next, in step 215, data from the CCD sensor 102 is read. Following reading CCD data, a decision step 220 is executed to determine whether a finger is detected. When a finger is detected operation proceeds to a decision step 225 to determine whether the light level is acceptable, and if it is not the level is adjusted and operation returns to step 215. If the light level is acceptable, operation proceeds to transmission step 230 wherein a message is sent to the computer 50 indicating that print data is to be sent. In another transmission step 235 a line of print data from the CCD sensor 102 is sent to the computer 50.

Operation then proceeds to a decision step 240 wherein it is determined whether the end of the image data has been sent to the computer 50. If transmission of the image data is not complete, a check is made in a status verification step 245 to see whether there is any mouse input, such as data from any of the left button 62, right button 64, x sensor 68, or y sensor 70 input by the user and, if such data has been input, it is sent to the computer 50 in a transmission step 250. Operation returns to the transmission step 235 wherein a next line of CCD data is sent to the computer 50 after the mouse input is sent to the computer 60 or if no mouse input is detected. If it is determined in the decision step 240 that transmission of image data is complete, operation returns to the beginning of the flowchart below the start step 200.

In step 205, if no read print command is received, operation proceeds to a status verification step 255 to see whether any mouse input has been input by the user and, if such data has been input, it is sent to the computer 50 in transmission step 260.

Once a complete set of image, or print data, is sent to the computer 50, the computer 50 then proceeds to process the data. In the present description, image data is also referred to as print data in reference to the input of a thumb print. However, it is realized that other types of biometric input may be used and that the present invention may optionally used to process such other data. Examples of such other data include a print image of any of the other digits or images of other unique biometric data such as retinal images. Thus, such applications are considered to be within the scope and spirit of the present invention.

After the thumb print image is scanned in and the image data thereof transferred to the computer 50, the image data is then processed and added to a database of print image data or used to gain access to use of the computer 50 by comparison to previously stored print image data in the database. Hereinafter, using image data to gain access is referred to as an authorization process while entering print image data into the database is referred to as a registration process.

Finger print image analysis may effect comparison of images. Alternatively, the present invention further provides an analysis algorithm that effects comparison of special points maps which indicate where special points, also known as minutia, of a fingerprint are located. The fingerprint analysis algorithm considers a fingerprint not as a determined object but as a stochastic object. There is a philosophical analogy, like the Laplas's determinism and the stochastic picture of the world. Another analogy is that the first practically significant results in speech recognition appeared as soon as the first stochastic models of human's speech had appeared. A discussion of standard approaches is found in the paper *A real-time matching system for large fingerprint databases*, N. K. Ratha, K. Karu, S. Chen, and A. K. Jain, IEEE Trans. on PAMI, August 1996, vol. 18, no. 8, pp. 799–813, which is incorporated herein by reference for its teaching relating to fingerprint analysis and modeling.

Factors that randomize print image data include elasticity of skin, humidity, level of impurity, skin temperature, individual characteristics of the user's finger-touch, among many other factors. The basic generation of a special points map optionally includes multiple finger touches of the same finger, that is, a user's thumb print is optionally scanned multiple times. Each image data from each scanning is referred to herein as a "standard." The greater the number standards of a user stored in the database, the higher the reliability of the recognition is. The shorter the process of studying multiple standards, the less the reliability of recognition is.

Applicants have conducted experiments showing that the reliability of recognition and the quantity of the standards exhibit the following relationship:

| Quantity of Standards | Reliability |
|---|---|
| 1 | 89% |
| 3 | 92% |
| 5 | 95% |
| 7 | 98% |
| 12 | 99.5% |
| 20 | 99.9% |

The term "reliability," as used above, relates to a probability of recognizing a registered user, that is, matching a user's thumb print data with thumb print data in the data base after one touch.

Figure 6:
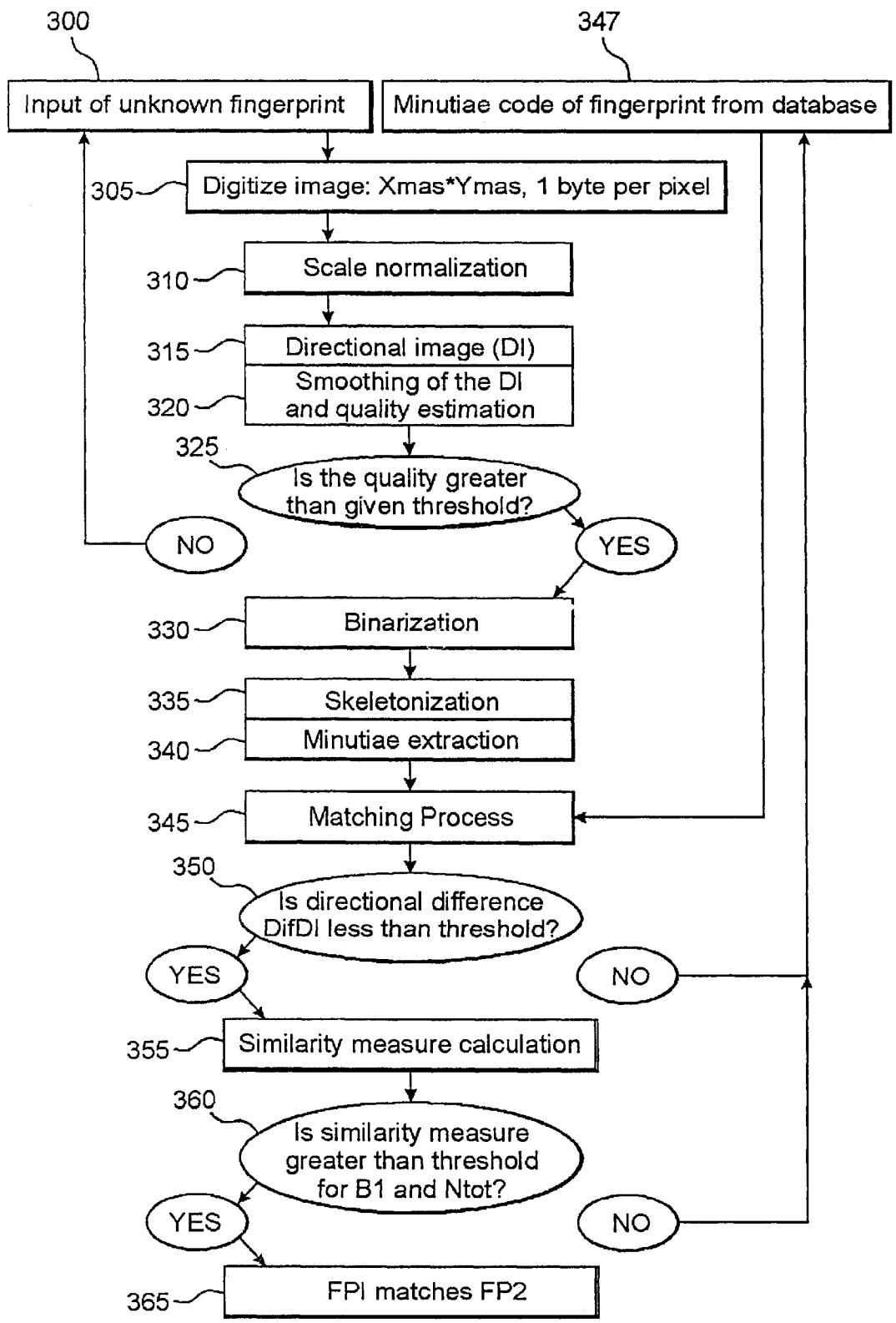
FIG. 6 is a flow chart of the comparison method of the present invention.

Referring to FIG. 6, a flowchart of a fingerprint analyzing algorithm of the present invention is shown. The algorithm is described below wherein the following definitions apply:

| VARIABLE | DEFINITION |
| --- | --- |
| Xn(i), Yn(i), An(i) | i-th minutia description wherein Xn is an x coordinate of the i-th minutia, Yn is an x coordinate of the i-th minutia, and An is an angle of the i-th minutia |
| FP | fingerprint |
| N | number of minutia of fingerprint after extraction |
| FPn | n-th fingerprint |
| MID | mean inter-ridge distance |
| DI | directional image |
| Xmas, Ymax | linear sizes of an input image |
| Fx, Fy | linear sizes (numbers of cells) in directional image, |
| Fstepx-Ymax/Fy | linear sizes of cells onto which the initial image is distributed to get directional image |
| Fn (i,j) | directional image for n-th fingerprint |
| Pi | discrete upper bound for 180 degrees |
| BI | number of cells of directional image that are not UnDir |
| UnDir (>Pi) | mask value to detect the absence of FP in a current cell, for n-th FP |

In imaging step 300, the user's thumb print is scanned by the CCD sensor 102 and then digitized in digitizing step 305, wherein analog levels for each pixel of the CCD sensor 102 are digitized to form one byte per pixel. Although depicted as separate operations, it is understood from the schematic of FIG. 4 that the analog levels of the pixels are successively digitized by the A/D converter 158 and stored in the RAM 156. Next, a sequence of filtering and contrasting transformations is executed on the initial matrix of intensity data. The aim is to get the more "stable" image of the fingerprint (while touching). Following storage in the RAM 158, the print image data FP is optionally transferred to the computer 50 as indicated in FIG. 5. However, in an alternative embodiment of the invention the filtering and contrasting transformations may be executed by the microcontroller 150 in the computer mouse 60.

The matrix of intensity data from the CCD sensor 102, that is, the print image data FP, includes the fingerprint and surrounding "garbage". In an optional process a border between the print image and the "garbage" is defined and the "garbage" is excluded so that only the internal part of the print image, that is the portion which includes ridge lines, takes part in the further analysis.

After the print image data FP is acquired, preprocessing of the print image data FP is carried out beginning with a scale normalization step 310 in which the scale of the print image data FP is normalized using standard routines. After the scale normalization step 310 the print image data FP is then used to calculate directional image data DI using gradient statistics in directional calculation step 315, wherein the print image is divided into cells having a size defined by Fx and Fy. Referring to FIG. 7, the print image data FP is divided into cells as shown by a grid superimposed on the print image and a vector normal to the direction of ridge lines in each cell is calculated. These vectors form the directional image data DI. Thus, an array of directional image data F(i,j) is generated where i and j denote the cell and the value of F(i,j) is between 0 and Pi for directional cells or is set to UnDir for cells wherein a directional gradient cannot be determined such as for isolated pixels or pixel groups lacking directionality. The directional image data DI is then subjected to a smoothing process and its quality factor Q is determined in a smoothing and quality processing step 320. The smoothing process includes first applying a low-pass filter and then a low-cut filter, after which a directional smoothing along the directions defined for each cell is effected. Scale normalization, low-pass filtering, low-cut filtering, directional image calculation and smoothing are processes that are realizable by those of ordinary skill in the art. Accordingly, detailed discussions thereof are omitted.

The quality Q of a print image data FP is then calculated by determining a ratio of cells that remain substantially unchanged following the smoothing and quality processing step 320 to the total number of cells. This ratio is then squared and multiplied by the area of the print image data FP divided by the area of the entire scanned image. Thus, both the quality of the print image data FP and absence of image data corresponding to a fingerprint are taken into consideration. Quality decision step 325 is then executed to determine whether the quality Q of the print image FP is above a given quality threshold. When the quality Q is below the given quality threshold, the process returns to the imaging step 300 for input of new data. This is because it is determined that the quality of the fingerprint is insufficient to base matching upon. If the quality is above the given threshold, processing proceeds a binarization step 330.

Figure 8C:
FIG. 8(c) is an image of the fingerprint of FIG. 8(a) following directional filtering and binarization.
Figure 8D:
FIG. 8(d) is an image of the fingerprint of FIG. 8(a) following skeletonization.

In the binarization step 330, the image data FP shown in FIG. 8(a) is subjected to preliminary binarization using subtraction of low-pass filtering resulting in the image data FP producing the image shown in FIG. 8(b), followed by directional filtering and binarization resulting in the image of FIG. 8(c). Processing continues with execution of a skeletonization step 335 wherein the image data FP is subjected to a thinning and skeletonization processing wherein all ridge lines are reduced to a width of one pixel which results in the image shown in FIG. 8(d). In this stage visible ridge lines, that are some pixels in width are being changed to lines one pixel in width. The values on the ridge lines are 1 and for all other areas the values are 0. Now the matrix consists of only two values. Detailed discussions of the filtering and skeletonization processes are omitted as such are realizable by those of ordinary skill in the art given the present disclosure.

Figure 9A:
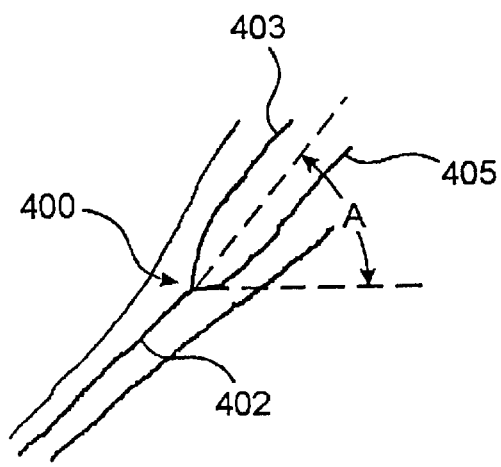
FIG. 9(a) is a depiction of a bifurcation.
Figure 9B:
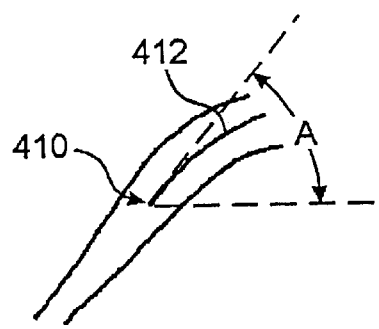
FIG. 9(b) is a depiction of an end.

A minutia extraction step 340 is next executed upon the image data FP that has been skeletonized. Fingerprints are characterized by various minutia which are particular patterns of the ridges. Two basic types of minutia are a bifurcation 400, or branch, shown in FIG. 9(a), wherein a ridge line 402 divides into two ridge lines, 403 and 405, and an end 410, shown in FIG. 9(b), wherein a ridge line 412 ends. Each minutia is characterized as a vector represented by a minutia data triplet X, Y, and A wherein X and Y represent the location of the minutia and A is an angle of a vector of the directionallization of the minutia as shown in FIGS. 9(a) and 9(b).

In a preferred embodiment of the present invention, distinction between end minutia 410 and bifurcation minutia 400 is not made. It is found that exclusion of such distinction results in reduction of data, reduced processing needs and time, while still providing acceptable reliability of fingerprint comparison. Alternatively, distinction may be made with associated increase in processing.

Figure 10:
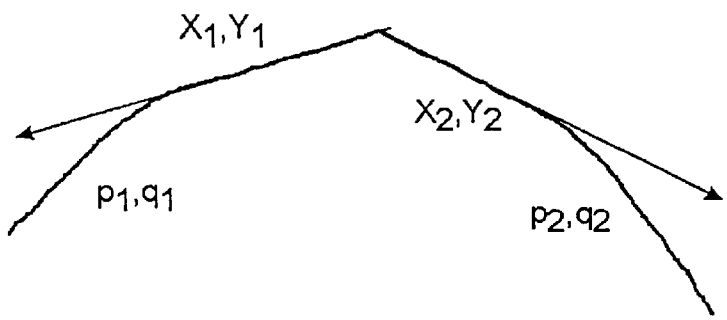
FIG. 10 is a depiction of an analysis of two minutia for exclusion purposes.

The minutia extraction step 340 further proceeds with exclusion of minutia that are too closely located. Referring to FIG. 10, two end minutia at (x1, y1) and (x2, y2), respectively, and represented by vectors (p1,q1) and (p2,q2), respectively, are shown. First, determination is made as to whether the two minutia are within a threshold distance. This threshold distance is optionally a distance r used to determine matching minutia and discussed below, a fixed distance, or another distance based on mean ridge line separation distance. When two minutia are within the given threshold distance, a determination is made whether the angle between the two vectors (p1,q1) and (p2,q2) is within a given threshold of 180° and the angle between (p2, q2) and (x2−x1, y2−y1) is within a given threshold of 0. If two minutia satisfy the aforesaid criteria they are excluded because that are too close and aligned in a nearly straight line. As a result of the minutia extraction process, the print image FP is now represented by a data set defined as FP={Q, N, F(i,j), X(k), Y(k), A(k)} wherein N is the total number of minutia for the fingerprint FP, and X(k), Y(k) and A(k) are the data triplet representing the k-th minutia. The minutia extraction is advantageous in reducing the amount of data to be processed and thereby reducing the processing time and requirements.

Processing next proceeds to a matching process step 345 wherein the print image data FP is compared to image data in the database. FP1 now refers to the image data of the input fingerprint and FP2 refers to print image data of a fingerprint retrieved from the database in database retrieval step 347. Likewise in this description, other variables are appended with 1 or 2 to represent the respective fingerprint.

It is necessary to find the best alignment of the directional images DI1 and DI2 of F1(i, j) and F2(i, j). Data F1(fa, fdx, fdy) (i, j) is now calculated wherein rotation by angle fa and shift by distances fx and fy is effected in an orthogonal transformation of F1(i, j). After the transformation of F1, a comparison of F1(fa, fdx, fdy) (i, j) with F2(i, j) is then made wherein differences in orientations of corresponding cells of the directional images D1 and D2 is calculated as DifDI. DifDI is calculated as the sum of all angular differences between corresponding cells. The values of fa, fdx, fdy iteratively varied and for each permutation thereof the transformation of F1(fa, fdx, fdy) (i, j) is made and compared with F2(i, j) to find a DifDI for each set of fa, fdx, fdy values. A set of fa, fdx, fdy values is then chosen for which DifDI is minimal. The chosen set of fa, fdx, fdy represent the best shifting parameters for shifting the directional image D1 to effect the best matching directional alignment of D1 and D2. Subsequent alignment of minutia for matching purposes uses the chosen set of fa, fdx, fdy as a starting point for adjustments. Additionally, BI is determined as the number of cells of cells (i, j) of either D1 or D2 that are not UnDir.

A directional difference decision step 350 is next executed wherein the minimal DifDI for the chosen set of fa, fdx, fdy is compared against a threshold $DifDI_{TH}$ which may be a set threshold or a threshold based on BI. If DifDI exceeds the threshold $DifDI_{TH}$, then it is determined that the correspondence level, or matching level, between the directional images is insufficient to warrant further comparison of FP1 and FP2 and a different fingerprint image data is chosen for FP2 and processing returns to the beginning of the matching process step 345. If DifDI is less than the threshold, operation proceeds to similarity measure calculation step 355.

Figure 11:
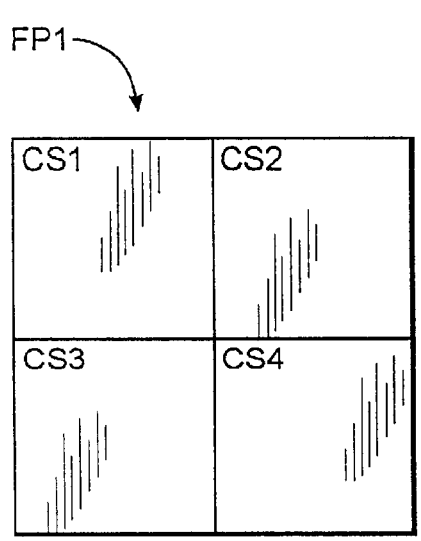
FIG. 11 is a simplified depiction of a fingerprint image data FP1 divided into clusters.
Figure 12:
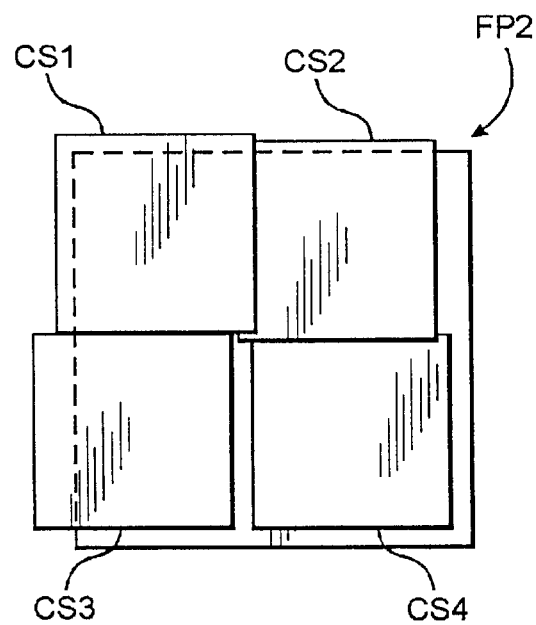
FIG. 12 is a simplified depiction of the clusters of FIG. 11 applied individually shift to print image data FP2.

Next, the chosen set of fa, fdx, fdy for orthogonal transformation is applied as (dfx*Fstepx, dfy*Fstepy and fa) to the minutia data triplets X1(k), Y1(k), and A1(k) of FP1, where k represents a k-th minutia. The transformed minutia data triplets of print image data FP1 are then grouped into clusters each containing not less than a given number of minutia, preferably seven. Referring to FIG. 11(*a*), FP1 is illustrated as being divided in four clusters CS1, CS2, CS3, and CS4, which each contain the given number of minutia (not shown). FIG. 11(*a*) is a simplified depiction of the process in that the clusters do not necessarily cover square regions of the print image and the number of clusters is not limited to four. The clusters may be thought of a regional groupings of minutia.

Referring now to FIG. 11(*b*), for each of the clusters CS1,CS2,CS3, and CS4 on a cluster by cluster basis, X1(k), Y1(k) of the minutia of the given cluster are all iteratively shifted in x and y directions by values dr, wherein dr is varied within a range R, such that abs(dr)<R, and a comparison of the shifted X1(k), Y1(k), A1(k) is made against all minutia in a BI grouping of FP2 for each set of dr set values to identify minutia of FP1 matching those of FP2. A pair of minutia are considered matched when a distance between them is less than a threshold r discussed below. The BI grouping of FP2 is the group of cells in FP2 that are not UnDir. For each shift of a cluster, a similarity measure Smt is taken, which is the sum of the following term for each set of matched minutia in the cluster:

$$m(x1, y1; x2, y2) = a \int_0^d \exp\left(-\frac{z}{\sigma^2}\right) dz + \delta,$$

where $$d = \sqrt{(x1-x2)^2 + (y1-y2)^2},$$

and α, δ and σ are empirical values. In an embodiment of the invention, α is 150, δ is set equal to R1, where R1 equals 30, and R2, where R2 equals 20, R1 and R2 being discussed below, and σ is set equal to 4. These values are exemplary and alterable without departing from the scope and spirit of the present invention. For each cluster, the set of dr values yielding the greatest similarity measure Smt is selected and the total sum of the greatest similarity measure of each cluster is taken to find a similarity measure Smt(FP1, FP2) for the comparison of FP1 to FP2.

As noted above, comparison of fingerprints is often hampered by various environmental and physiological factors. The division of FP1 into clusters provides compensation in part for such factors as stretching and shrinking of the skin. For a given cluster, the total distance difference due to stretching or shrinkage between two minutia is limited due to the limited size of the cluster area. Thus, adverse effects of shrinking and stretching are minimized. Accordingly, individual cluster shifting and comparison are a preferred embodiment of the present invention. Alternatively, division of FP1 into clusters may be omitted and shifting and comparison of FP1 as a whole effected.

The maximum similarity measure Smt(FP1, FP2) is generated for the best comparisons of all clusters of FP1 with FP2, along with a number Nmat of matched minutia, and a number Ntot which is the total number of minutia within the BI grouping of FP1. An overall similarity measure for the comparison of FP1 with FP2 is calculated as follows:

Nmt(R,r,BI,Ntot)=Smt(FP1, FP2)−DifDI where Smt(FP1, FP2) is a sum of the best Smt of each cluster. Thus, this takes into account the maximal number of matched minutiae, DifDI and statistical peculiarities of distances distribution.

Processing then proceeds to similarity decision step 360 wherein Nmt(R, r, BI, Ntot) is compared with a threshold Thr(R, r, BI, Ntot). If Nmt(R, r, BI, Ntot) is greater than the threshold Thr(R, r, BI, Ntot), it is determined the FP1 matches FP2 and a match is indicated in match indication step 365. If Nmt(R, r, BI, Ntot) is less than or equal to the threshold Thr(R, r, BI, Ntot) it is determined the FP1 does not match FP2 and execution proceeds to the data base retrieval step 347 for the selection of another set of print data from the database for use as FP2 in the process which returns to the matching process step 345. Indication of a match is then used to permit access to the computer 50 in general or specific functions thereof.

In a preferred embodiment of the invention, the threshold Thr(R, r, BI, Ntot) is determined on the basis of threshold training using a sample pool of fingerprints from a number of individuals. The sample pool is composed of a number of samples, or standards, from each individual in the pool. The number of samples from each individual in one example is 4 and the number of individuals is in a range of 100 to 1000. The number of samples and individuals may be varied from the exemplary values and range without departing from the scope and spirit of the present invention. The process steps 305 through 355 of FIG. 6 are then executed for each print with every print being compared to every other print. Since the sample pool is known, comparisons of prints from a same individual and comparisons of prints from different individuals are known.

In performing the threshold training, n number of variations of R and r are used and are shown below as R1, R2 and r1, r2 for an example where n=2. For example, values are set such that R1<R2 and r1<r2 where R1=2*MID, r1=MID, R2=3.5–4 MID, and r2=2*MID. MID is the mean inter-ridge distance of the prints in the sample pool. The following values are found:

NmtS(R1,r1,BI,Ntot), NmtA(R1,r1,BI,Ntot), and
NmtS(R2,r2,BI,Ntot), NmtA(R2,r2,BI,Ntot), where NmtS is number of matched minutia for prints compared from the same individual while NmtA is the number of matching minutia resulting from the comparison of fingerprints from different individuals.

For a given BI,Ntot (within subrange of appropriate quantization), BestA(n,BI,Nmat) is set to the max NmtA (Rn,rn,BI,Ntot), of all the comparisons of fingerprints from different individuals, and MinNmtS(Rn,rn,BI,Ntot) is set to the minimum NmtS(Rn,rn,BI,Ntot) of all comparisons of fingerprints from the same individual for n=1,2, etc. The thresholds are then calculated as follows:

Thr(n,BI,Nmat)=(BestA(n, . . . )+MinNmtS(Rn,rn, . . . ), where

NmtS(Rn, . . . )>BestA(Rn, . . . )/2.

In conjunction with the above discussion of threshold calculations, the similarity decision step 360 produces a positive match indication if for the current BI, Ntot:

Nmt(R1,r1,BI,Ntot)>Thr(1,BI,Ntot), or

Nmt(R2,r2,BI,Ntot)>Thr(2,BI,Ntot).

If this condition is not found, then the dichotomy analysis gives some correction. The results of identical and not identical matchings is considered as two classes of patterns and the pairs of values Nmt(R1,r1, . . . ), Nmt(R2 ,r2, . . . ) as feature coordinates. The dichotomies are performed by the second order threshold functions which are calculated according to chapter 2.3. in the classical book by J. Tu and R. Gonzalez "Pattern Recognition Principles" Addison-Wesley Publ. 1974, which is incorporated herein by reference for its relevant dichotomy teachings.

The complete description to be stored in the database is a multilevel structure of 4 (or more) FP data sets taken from the different applications of the same FP. Each level of the structure corresponds to minutia appearance frequencies for all FP codes.

Optionally, instead of using thresholds for the similarity comparison as discussed above, fixed values may be chosen and used as threshold values.

The data base of fingerprints of individuals for whom identification is required is created by a registration process. The registration process entails a given individual having their fingerprint scanned a number of times, for example four. Of the four scannings, the scanning producing the greatest number of minutia is then selected for the database.

The present invention further includes use of the above fingerprint minutia extraction and comparison process in conjunction with a cryptographic protection process. For this aspect of the invention, the computer 50, also referred to as the client, will send fingerprint data to the remote computer 51, also referred to as the server, over the link 53 which may be, for example, a link over the Internet. Thus, security protection for data sent over the link 53 is required.

There are three different cryptographic procedures used in the cryptographic process. As they are not used simultaneously, they are described below separately. All cryptographic parts are written in italic font. The cryptographic method employed is RSA encryption.

I. User Registration

In order to use the cryptographic process, the user must first register his fingerprint with the server. In order to maintain security, the fingerprint data must be encrypted to prevent unauthorized interception thereof. The following steps are used:

1. User fills in a registration form including a UserID. Other information such as Name, E-mail address, etc. may be included.
2. User scans his fingerprint into the computer 50 via the biometric input device where it is stored as image data. The image data is typically on the order of 64 KB.
3. The computer 50 then converts the image data of the finger to the data set defined as FP={Q, N, F(i,j), X(k), Y(k), A(k)} using processing steps 310 through 340 shown in FIG. 6. This data set is also referred to herein as a passport. Optionally, components of the data set may be omitted, such as F(i,j), so the passport may be shortened to about 1.2 KB.
4. The client, computer 50, then sends a request for the public key to the server via the link 53.
5. Server sends its public key $K_E$ via the link 53.
6. Client encrypts its passport and his UserID using RSA algorithm and public key $K_E$. In a preferred embodiment the length of the key is 512 bits:
C=RSA.Encode Public ($K_E$, passport, UserID)
7. The computer 50 sends C to the remote computer 51 via the link 53.
8. The remote computer 51 decrypts message using its secret key $K_D$:
M=Passport+UserID=RSA.Encode Secret ($K_D$, C)
9. The remote computer 51 then adds the UserID and passport to the database.

II. User Authorization

The user authorization process is used where a user wishes to gain access to the remote computer on the basis of his finger print matching one in the database.

1. User scans his fingerprint image data into the computer 50.
2. The computer converts the image of the finger to the passport using processing steps 310 through 340 shown in FIG. 6.
3. The computer 50 sends a request over the link 53 to the remote computer 51, the server, for the public key to the server.

4. The remote computer 51 sends its public key $K_E$ to the computer 50.
5. The computer 50 encrypts the passport and UserID using RSA algorithm using the public key $K_E$:
C=RSA EncodePublic ($K_E$, passport, UserID)
6. The computer 50 sends C to the remote computer 51 via the link 53.
7. The remote computer 51 decrypts message using its secret key $K_D$:
M=passport+UserID=RSA EncodeSecret ($K_D$, C)
9. The remote computer 51 then searches the database for the UserID, finds the corresponding passport, and executes steps 345 through 365 of FIG. 6 using the passport retrieved from the database as FP2. Optionally, step 350 is omitted. If the comparison of step 360 is positive, access is authorized. If the UserID does not exist or the comparison result of step 360 negative, authorization for access is refused.

III. Installation of the Server and Addition of New Users is Effected by the Following Steps 1. Installation of normal Web-server components.
2. Generation of the public and secret keys for the administrator of the server: first of all random integer is generated, possibly based on administrator's fingerprint, which is in part random, then the deterministic algorithm is started to determine public and secret keys.
3. When the new user is being registered, server takes its UserID and passport and encrypts them with administratrator's public key.

Usage of two different keys makes it more difficult to corrupt fingerprint data since an intruder must obtain both public and private keys to complete his attack. Different servers will have different keys to ensure that corrupted fingerprint data (i.e. stolen from some server) could not be used on other servers.

The 512-bits RSA keys are extremely difficult to crack. In fact, the keys of that length are not known to have been broken, so current cryptography declares them as keys for long-term secret information (30–50 years or longer). Average time of encryption of passport (client side) is less than a second. Average time of decryption of passport (server side) is about 2 seconds, so it is reasonable to predict that network delays would be more significant. Besides, servers are usually more powerful than the client computers.

A further aspect of the present invention provides software for working in the Windows environment. In particular, a protection icon is provided which an authorized user, one whose passport has produced a positive comparison, may move and drop on a file or program object to require that future access thereto be permitted only when a positive fingerprint comparison has been executed. Optionally, the user may input a list of UserID's for whom access will be allowed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A biometric comparison method comprising the steps of:
(a) scanning in a fingerprint to and digitizing scanning signals to produce a matrix of print image data representing pixels;
(b) dividing said print image data into cells, each including a number of pixel data for contiguous pixels;
(c) calculating a matrix of directional image data DI using gradient statistics applied to said cells wherein said directional image data DI includes for each of said cells a cell position indicator and one of a cell vector indicative of a direction of ridge lines and an undirectional flag indicative of a nondirectional calculation result;
(d) skeletonizing said print image data;
(e) extracting minutia from said print image data and producing a minutia data set comprised of data triplets for each minutia extracted including minutia position data and minutia direction data;
(f) providing reference fingerprint data from a database wherein said reference fingerprint data includes reference directional image data DI and a reference minutia data set;
(g) performing successive comparisons of said directional image data DI with said reference directional image data DI and determining a directional difference DifDI for each of said successive comparisons wherein for each of said successive comparisons one of said directional image data DI and said reference directional image data DI is positionally shifted by adding position shift data;
(h) determining for which of said successive comparisons said directional difference DifDI is the least and selecting said position shift data thereof as initial minutia shift data;
(i) positionally shifting minutia data by applying said initial minutia shift data to one of said minutia data set and said reference minutia data set to initially positionally shift said minutia position data and said minutia orientation data;
(j) performing successive comparisons of said minutia data set with said reference minutia data set following said positionally shifting minutia data and determining matching minutia based on a minutia distance criteria, a number of matching minutia, and a similarity measure indicative of correspondence of said matching minutia for each of said successive comparisons wherein, for each of said successive comparisons, one of said minutia data set and said reference minutia data set is positionally shifted within a minutia shift range R by adding minutia position shift data;
(k) determining a maximum similarity measure of said similarity measures of said successive comparisons; and
(l) determining whether said maximum similarity measure is above a similarity threshold and indicating said reference fingerprint data and said fingerprint data are from the same fingerprint when said maximum similarity measure is above said similarity threshold.

2. The biometric comparison method of claim 1 further comprising the steps of:
(c1) identifying as part of step (c) a directional group of cells comprising all cells of said cells that do not have said undirectional flag associated therewith; and
(j1) excluding from said successive comparisons in step (j) minutia of said minutia data set and said reference minutia data set located in or positionally aligned with said cells that have said undirectional flag associated therewith.

3. The biometric comparison method of claim 1 wherein:
   step (j) includes:
   dividing said minutia data set into said minutia data set clusters formed of contiguous one said cells and each including a predetermined number of said minutia before conducting said successive comparisons; and
   conducting said successive comparisons for each of said minutia data set clusters and determining for each of said minutia data set clusters a maximum similarity measure; and
   step (k) includes determining said maximum similarity measure as a sum of said maximum similarity measures of each of said minutia data set clusters.

4. The biometric comparison method of claim 1 wherein step (e) includes excluding from further processing pairs of said minutia located within a minutia exclusion distance of one another and having minutia direction data with a direction exclusion limit of being in opposite directions.

5. The biometric comparison method of claim 1 wherein said minutia extraction step (e) extracts minutia limited to ends and bifurcations.

6. The biometric comparison method of claim 1 wherein said minutia extraction step (e) wherein said minutia data set excludes data distinguishing ends and bifurcations.

* * * * *